W. E. RENDLE.
MOTOR PROPELLED VEHICLE.
APPLICATION FILED AUG. 9, 1915.
1,213,260.
Patented Jan. 23, 1917.
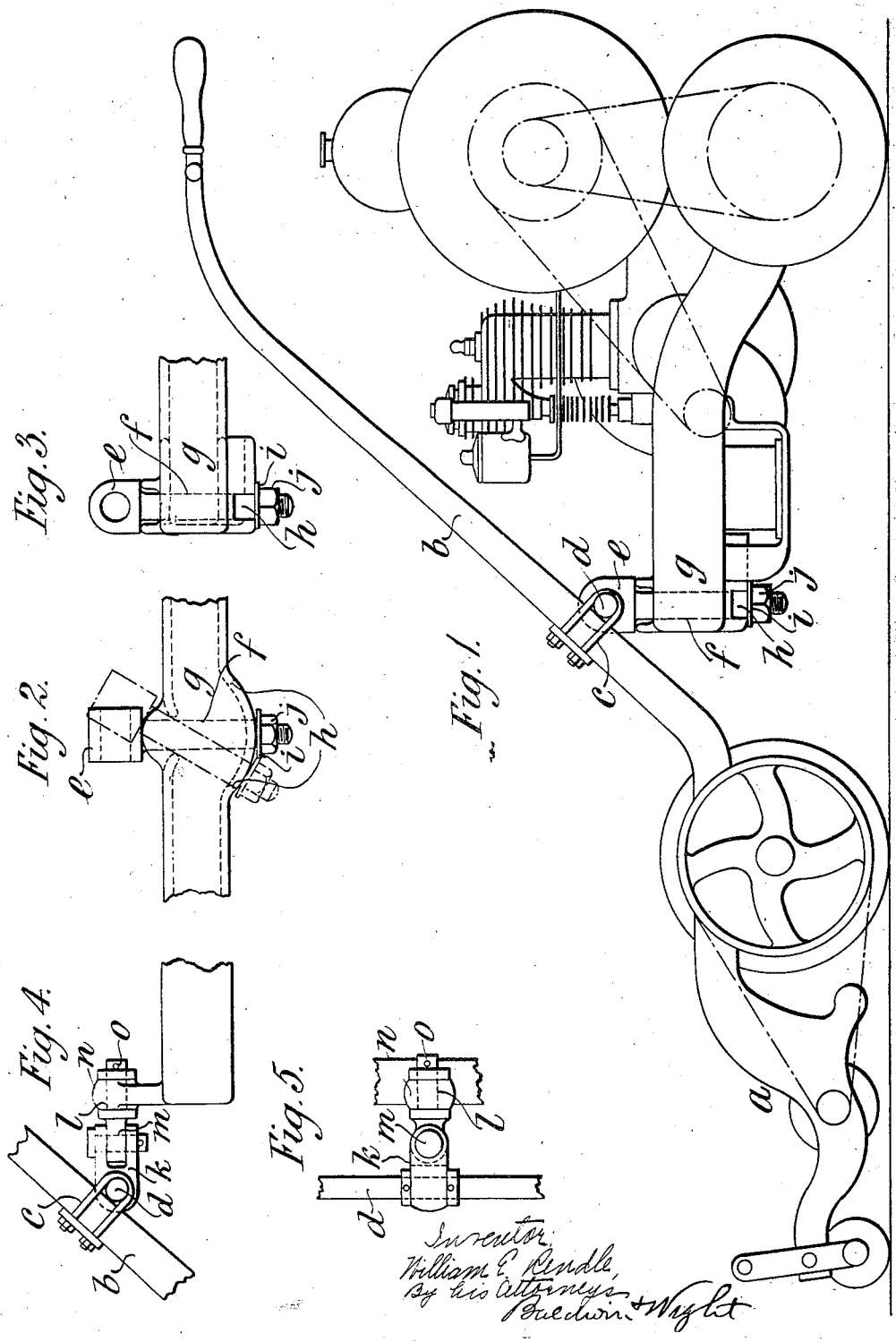

UNITED STATES PATENT OFFICE.

WILLIAM EDGCUMBE RENDLE, OF WESTMINSTER, LONDON, ENGLAND.

MOTOR-PROPELLED VEHICLE.

1,213,260. Specification of Letters Patent. Patented Jan. 23, 1917.

Application filed August 9, 1915. Serial No. 44,633.

*To all whom it may concern:*

Be it known that I, WILLIAM EDGCUMBE RENDLE, a subject of the King of Great Britain, residing at 5 Victoria street, Westminster, London, England, have invented new and useful Improvements in Motor-Propelled Vehicles, of which the following is a specification.

This invention relates to improvements in propelling vehicles by motor driven machines, more especially relating to the propulsion of lawn mowers and other slowly moving vehicles.

According to this invention the rear end of the motor driven machine is supported on a wheel or wheels but its front end is connected solely by a joint permitting movement about three axes at right angles to each other.

The drawings show the invention applied to a lawn mower.

Figure 1 is an elevation, Fig. 2 is a part front view of a motor driven machine and Fig. 3 is a side elevation of the same. Fig. 4 is a side view and Fig. 5 a plan of a modification.

The mowing machine $a$ has handles $b$ to which is secured by clamps $c$ a horizontal cross bar $d$ free to turn in a bearing in an enlargement $e$ at the top of a pin $f$ which passes through a socket in the front end $g$ of the frame of the motor driven machine. The socket is cut away at the bottom as shown at $h$ in Fig. 2 and the pin $f$ is held in the socket by means of a washer $i$ and a nut $j$ screwing on to the end of the pin $f$.

In the modification shown in Figs. 4 and 5, a short fork $k$ is pivoted at the middle of the cross bar $d$ and one end of a short horizontal shaft $l$ is pivoted on a vertical pivot $m$ between the arms of the fork $k$, the horizontal shaft $l$ being free to turn in a bearing $n$ fixed to the front end of the motor driven machine and is retained therein by a pin $o$.

What I claim is:—

1. The combination with a vehicle having handles for steering it, of a motor driven vehicle, a horizontal cross bar, clips which attach the cross bar to the handles, and a universal joint between said bar and the motor driven vehicle which permits the steered vehicle to be turned independently of the motor driven vehicle.

2. A vehicle connected to a motor driven machine by a bar fixed to the vehicle and free to turn in a bearing in a pin held in a socket larger at the bottom than at the top in the motor driven machine.

WILLIAM EDGCUMBE RENDLE.